(12) United States Patent
Joseph et al.

(10) Patent No.: US 12,361,020 B2
(45) Date of Patent: Jul. 15, 2025

(54) DISTRIBUTED DATA ACCESS CONTROL

(71) Applicant: Comcast Cable Communications, LLC, Philadelphia, PA (US)

(72) Inventors: Sony Joseph, Mountain View, CA (US); Jonathan Heller, New York, NY (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1120 days.

(21) Appl. No.: 15/436,240

(22) Filed: Feb. 17, 2017

(65) Prior Publication Data

US 2017/0322992 A1 Nov. 9, 2017

Related U.S. Application Data

(60) Provisional application No. 62/333,517, filed on May 9, 2016.

(51) Int. Cl.
*G06F 16/27* (2019.01)
*G06F 16/22* (2019.01)
(Continued)

(52) U.S. Cl.
CPC ........ *G06F 16/273* (2019.01); *G06F 16/2255* (2019.01); *G06F 16/23* (2019.01);
(Continued)

(58) Field of Classification Search
CPC ...... G06F 16/27; G06F 16/2471; G06F 16/23; G06F 16/2255; G06F 21/62; G06F 21/6218
(Continued)

(56) References Cited

U.S. PATENT DOCUMENTS 6,938,168 B1* 8/2005 Gomez ............... G06Q 10/06
726/5
2003/0163566 A1* 8/2003 Perkins ............... G06F 21/335
709/225
(Continued)

FOREIGN PATENT DOCUMENTS

EP 1503267 2/2005

OTHER PUBLICATIONS

Guy Zyskind et al.,Decentralizing Privacy: Using Blockchain to Protect Personal Data, 2015 IEEE Security and Privacy Workshops, May 1, 2015, pp. 180-184.

*Primary Examiner* — Joshua Bullock
(74) *Attorney, Agent, or Firm* — BakerHostetler

(57) ABSTRACT

Systems for distributed controlled access to data stored across a plurality of sources are disclosed. A plurality of content providers maintain user databases. A first distributed database contains a master identifier for each user of each content provider. Stored in relation to the master identifier are the locations of the user's data in each of the content providers. A second distributed database comprises data identifying for each of the users, entities that are authorized to access the user's data. In response to a request from an entity, the second database is queried and, based upon access rights data, user's whose data the requesting entity may view are determined. The first distributed database is queried to determine for the identified user, the location of user data. The data is retrieved and stored at a location accessible by the entity. The second distributed database is updated to record the data access.

16 Claims, 5 Drawing Sheets

(51) Int. Cl.
*G06F 16/23* (2019.01)
*G06F 16/2458* (2019.01)
*G06F 16/25* (2019.01)
*G06F 21/62* (2013.01)

(52) U.S. Cl.
CPC .......... *G06F 16/2471* (2019.01); *G06F 16/25* (2019.01); *G06F 16/27* (2019.01); *G06F 21/62* (2013.01); *G06F 21/6218* (2013.01)

(58) Field of Classification Search
USPC ........................................................ 707/609
See application file for complete search history.

(56) References Cited

U.S. PATENT DOCUMENTS

| | | | | |
|---|---|---|---|---|
| 2007/0198700 | A1* | 8/2007 | Vivian | G06F 11/2097 709/224 |
| 2010/0121831 | A1* | 5/2010 | Lin | G06Q 30/02 707/706 |
| 2012/0323849 | A1* | 12/2012 | Garin, Jr. | G06F 16/27 707/617 |
| 2013/0046781 | A1* | 2/2013 | Frankel | G06Q 30/02 707/769 |
| 2014/0310293 | A1* | 10/2014 | Knoll | G06F 16/24552 707/756 |
| 2014/0379640 | A1* | 12/2014 | Romatoski | G06F 16/93 707/610 |
| 2016/0078490 | A1* | 3/2016 | Tumen | G06Q 30/0269 705/14.66 |
| 2016/0189214 | A1* | 6/2016 | Dai | G06Q 30/0255 705/14.53 |
| 2017/0078299 | A1* | 3/2017 | Castinado | H04L 63/102 |
| 2017/0140436 | A1* | 5/2017 | Zheng | G06Q 30/02 |

* cited by examiner

DISTRIBUTED DATA ACCESS CONTROL

CROSS-REFERENCE TO RELATED APPLICATIONS

This application claims priority to U.S. Provisional Patent Application No. 62/333,517, filed May 9, 2016, which is incorporated herein by reference in its entirety.

BACKGROUND

A consumer may view digital content from multiple different content providers. For example, a consumer may view digital content provided by a cable television provider on her television. The same consumer may use the television device to view digital content delivered over the Internet from a video streaming service such as, for example, Hulu, Netflix, and Roku. The consumer may use a different device such as, for example, a mobile phone to view content provided by a web page service provider or a content provider. The consumer may use a game console to consume digital content served over the Internet by a game service.

Each of the service or content providers with which a user interacts may store information about the user and, over time, accumulates data relating to the user's interactions with the particular service. But each service or content provider typically lacks data relating to the users of other of the numerous different service providers. In a typical arrangement, no one service or content provider has stored thereon data reflecting the interactions of the consumer with the other service providers.

This disclosure identifies and addresses shortcomings in selectively providing access to user data across content providers.

SUMMARY

Systems and methods are described that provide distributed controlled access to data stored across a plurality of data sources. According to one aspect, each of a plurality of service or content provider systems maintains a user database comprising data regarding the users of the particular content provider system. Each of the user databases comprises, for each user of the particular content provider system, data specifying user characteristics and demographic information such as preferences, settings, age, address, etc.

According to another aspect, a first distributed database, which is propagated to or is accessible by each of the content provider systems, contains an master public identifier for each of the plurality of users that are registered with any of the plurality of data sources. The first distributed database has stored in relation to the master public identifier, data identifying each content provider system that the particular user accesses and the location in each of the identified content provider system of the user data for the particular user.

A second distributed database, which is also propagated to or is accessible by each of the service or content provider systems, comprises access rights data identifying for each of the users, entities that are authorized to access the user's data. The second distributed database further comprises data that records a history of the accesses that are made to the user data in the various user databases by the entities. Accordingly, as entities access the user data stored by the various service/content providers, the second distributed database is updated to record which data has been accessed.

In an aspect, and in response to receiving a request for user data from a requesting entity, the system queries the second distributed database and, based upon access rights data stored therein, determines the user or users whose data the requesting entity is authorized to view or access. The system queries the first distributed database to determine for the identified user, the location of user data in the various content provider systems. The system uses the identified locations to retrieve data regarding the determined users and stores the retrieved data at a location accessible by the requesting entity. The system updates the second distributed database to record the particular user data that has been accessed by the requesting entity.

The disclosed systems and methods may be applied to address any suitable technological need. For example, the distributed controlled access may be applied in order to control access to user data in connection with a process of determining advertisements that might be suitable to be presented to particular viewers. In such a scenario, the second distributed database may comprise data identifying which advertising entities may access particular user data stored by the various content/service providers. If an advertising entity accesses content/service provider user data in connection with determining suitable advertisements to be displayed, the second distributed database may be updated to reflect that the particular advertising entity has accessed particular data.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Figure 1:
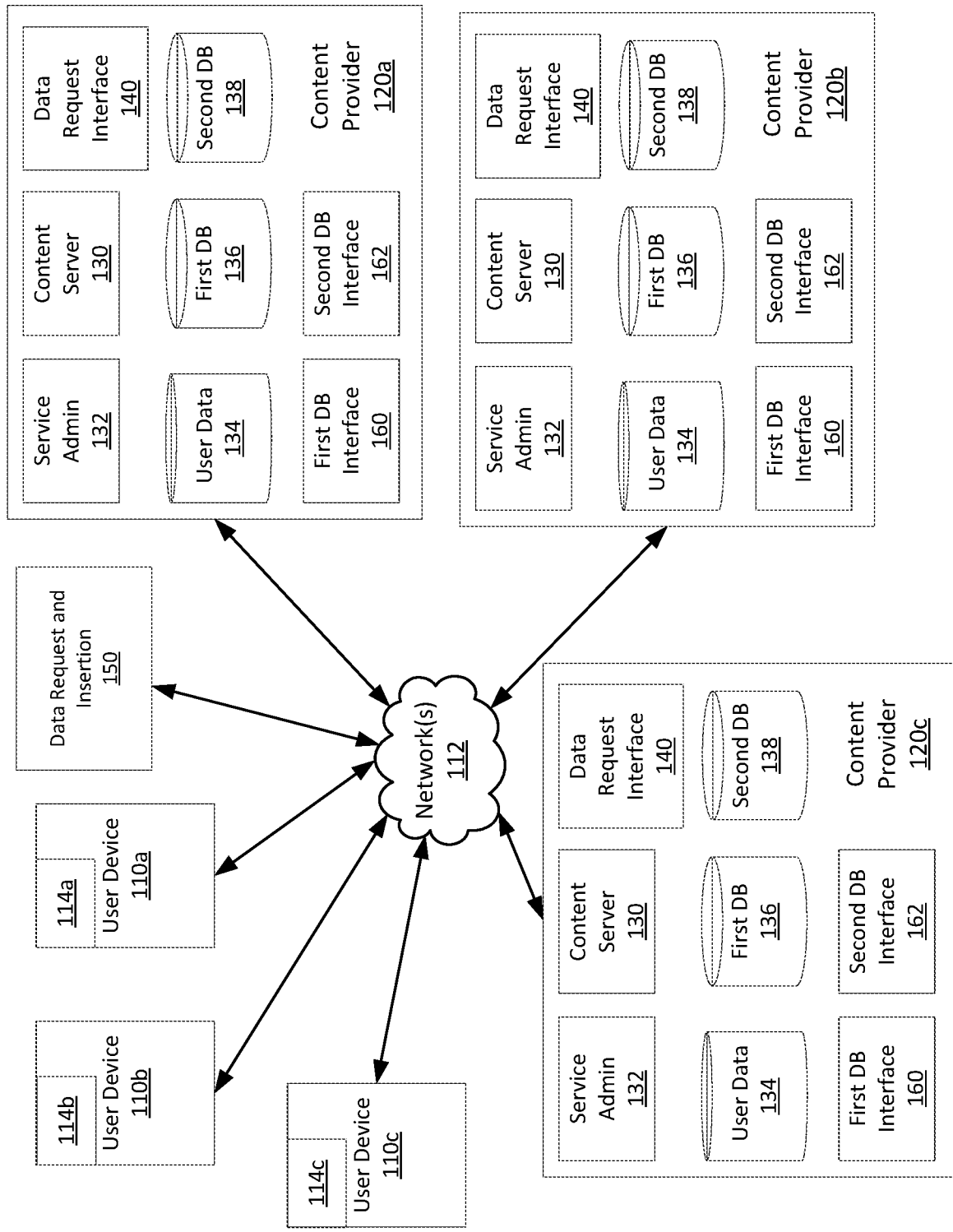
FIG. 1 depicts an example computing environment.

Consumers view digital content from a multitude of content provider sources. For example, a single consumer may view digital content provided by a cable or satellite television provider, multiple internet streaming video providers, numerous Web sites, as well as many other content sources. The same user may use numerous different devices to access the multitude of content sources.

Each content provider system from which a user receives digital content typically maintains data about the particular user and her use of the particular content provider system. The entirety of the data regarding a user and her viewing of digital content is fragmented across the multitude of content provider systems.

The fragmentation of the data limits its usefulness. For example, in connection with targeted advertising, user data that is fragmented across numerous different systems and locations hinders measuring an audience holistically across viewing environments. An advertiser, or a targeted content creator, typically is interested in having a message be directed at one target audience, and in knowing that the message has reached the intended audience in all of the locations the audience views content. But where the data is fragmented across multiple content provider systems, these objectives cannot easily be met.

One manner of addressing the limitations caused by fragmented user data is to aggregate the user data into a single data set. For example, all of the user data from all of the various content provider systems may be gathered and stored in one location. While such a solution may be technically achievable, it is often not commercially or politically practical. The entities that own the content provider systems and the user data stored therein typically are interested in maintaining control and/or exclusivity of their own data and do not wish to share the data with competitors. Even the possibility of a neutral third party aggregating data from multiple entities is not typically acceptable as the contributing entities may not wish for one party, even one that is arguably neutral, to benefit and wield power that comes from controlling the aggregated data.

Systems and methods are described herein that provide distributed controlled access to data stored across a plurality of data sources. The described systems and methods provide for data to be aggregated from across separately maintained and distributed data sources.

In a first aspect, each of a plurality of content service providers maintains a user database comprising data regarding the users of the particular content service provider. For example, a cable service provider maintains a database comprising information identifying its subscribers. Likewise, a web application service maintains a database comprising information identifying its subscribers. Each of the user databases comprises, for each user of the particular content service provider, data identifying the particular user and data specifying characteristics of the particular user. For example, a user database may comprise a user identifier and data specifying the particular user's demographic information such as address, age, income, marital status, education level attained, schools attended, organizations belonged to, etc., and any other characteristics such as areas of interest and viewing preferences and history. As a user interacts with a particular content service to request and consume content, the user database of the particular service provider may be updated to record information about the user interactions.

In an example scenario, the user data is stored in encrypted form. Each user may be assigned a public/private key pair. The user's private key may be a hierarchical private key that is generated from a private key that is associated with the service provider. A user's data that is stored in a content service provider's user database is encrypted using the particular user's public key. The encrypted data may be decrypted using either the user's private key or by the service provider's private key.

According to an aspect, a first distributed database, which is propagated to or is accessible by each of the content or service provider systems, contains a master public identifier for each of the plurality of users that are registered with any of the plurality of data sources and providers. The first distributed database is accessible by each of the content or service provider systems. In an example embodiment, each content/service provider may maintain a separate local copy of the first distributed database. As updates are made to any one of the local copies, the updates are propagated or distributed to the other local copies. Accordingly, the first distributed database is shared by and accessible to each of the content/service provider system. The first distributed database may have stored in relation to the master public identifier, data identifying each content or service provider system that the particular user employs or uses and the location in each of the identified content provider system of the user data for the particular user.

The first distributed database may have stored in relation to each user's master public key, a user identifier for each of the content/service providers with which the particular user is associated. In an example scenario, the user identifiers stored in the first distributed database may be the public keys from each of the content provider systems with which the particular user interfaces. The data identifying the location of the user data in each of the content provider systems may be stored in relation to the user public key for the particular content provider system.

A second distributed database, which is also distributed amongst and propagated to each of the content provider systems, comprises access rights data identifying for each of the users, entities that are authorized to access the user's data. For example, the second distributed database may comprise data identifying that for a particular user, a particular entity such as, for example, a company that sells goods or services, or a company that sells or brokers advertisement placement opportunities, is authorized to receive or access data relating to the particular user. In an example scenario, the data may specify that a particular car manufacturer is authorized to receive data regarding a particular user. In another example scenario, the data may specify that a particular advertisement broker is authorized to receive data regarding a particular user.

The second distributed database further comprises data that records accesses made to the user data in the various user databases. Accordingly, when a particular entity is provided access to a user data maintained by a particular content service provider, the second distributed database is updated to reflect the access provided to the particular entity.

The system is programmed to receive requests for user data stored in the various user databases maintained by the distributed content service providers. In response to receiving a request for user data, the system queries the second distributed database and, based upon access rights data stored therein, determines the user's whose data the requesting entity is authorized to view. For example, in response to a request from a particular entity for user data, the system queries the second distributed database to determine for which users, if any, the particular entity is authorized to view user data.

In the scenario where the requesting entity is determined to be authorized to view data relating to one or more users, the system queries the first distributed database to determine for the identified users, the location of user data in the corresponding content provider systems. For example, where a particular user whose data the particular entity is authorized to access uses two different content provider systems, the system determines the locations on each of the two content provider systems of the data relating to the particular user.

The system retrieves the data regarding the determined users from the corresponding locations and stores the retrieved data at a location accessible by the requesting entity. The system updates the second distributed database to record the particular user data that has been accessed by the requesting entity.

FIG. 1 depicts an example computing environment suitable for distributed controlled access to data stored across a plurality of data sources. As shown, a plurality of user devices 110*a-c* are communicatively coupled over networks 112 with content or service provider systems 120*a-c*. Users employ the user devices 110*a-c* to access digital content such as, for example, video content, audio content, and web content from the content provider systems 120*a-c*. Each of the user devices 110*a-c* may be any device or system that is adapted to receive and render digital content including, for example, a television, tablet computer, smart phone, game console, or similar device. Each of the user devices 110*a-c* has an autonomous program 114 executing thereon that is adapted to determine instances that the particular device has been used to access more than one content provider.

The networks 112 are adapted to communicate data between the user devices 110*a-c* and content service providers systems 120*a-c*. The networks 112 may comprise one or more networks that are suitable to communicate data including, for example, cable distribution networks, local area networks, and the Internet.

The content provider systems 120*a-c* are adapted to generate and forward digital content across the networks 112 to the user devices 110*a-c*. The content provider systems 120*a-c* may be adapted to transmit any suitable digital content. For example, the content provider system 120*a* may be associated with a cable television provider and be programmed to forward television programming content to devices 110*a-c*. The content provider system 120*b* may be a service that provides video on demand services over the Internet. The content provider system 120*c* may be programmed to serve Web page content.

A user may use one or more of devices 110*a-c* to access data from multiple of the content provider systems 120*a-c*. In an example scenario, a user may employ the user device 110*a*, which may be a television, to view digital content served by the content provider system 120*a* which, in an example, may be a cable service provider system. The same user may use the user device 110*b*, which may be a tablet computer, to view Web content served by the content provider system 120*b* which, in an example, may be a Web services provider. The user may use the user device 110*c*, which may be a mobile phone device, to view video served by the content provider system 120*c* which, in an example, may be a video streaming service.

Each of the content service systems 120*a-c* stores data regarding uses of the system. For example, in a scenario where the service provider system 120*a* is a cable service provider, the system 120*a* may record information regarding users of the cable service. Similarly, in the scenario where the service provider system 120*b* is a Web services provider, the system 120*b* may record information regarding users of the Web services. Further, in the scenario where the service provider system 120*c* is a video streaming service, the system 120*c* may record information regarding users of the streaming service. The disclosed systems provide distributed control of access to the user data maintained separately on each of the content provider systems 120*a-c*.

A data request and insertion system 150 may forward requests over the networks 112 to the content provider systems 120*a-c* to request data that has been accumulated by the content provider systems 120*a-c*. The data request and insertion system 150 may be programmed to request and receive data relating to users, and, based upon the received user data, to determine content that should be inserted into digital content that is generated by a content server system 120. More particularly, the data request and insertion system 150 may be programmed to request and analyze data regarding users of a content server system 120 and, based upon the analysis of the user data, request that content relating to advertising be inserted into the digital content transmitted by the content server system 120. For example, the data request and insertion system 150 may be programmed to operate as an advertisement insertion system. The data request and insertion system 150 requests and receives user data from systems 120*a-c* and analyzes that data to determine which advertisements would be best suited to be served for particular users and groups of users. The data request and insertion system 150 communicates with the content provider systems 120*a-c* to insert the determined advertisements into the content that is being served by the content provider systems 120*a-c*. In an example scenario, the data request and insertion system 150 may communicate a particular advertisement to content provider system 120*a* and direct the content provider system 120*a* to insert the advertisement in content being directed to particular users and/or at a particular time.

Each of the content provider systems 120*a-c* may comprise a plurality of functional components. As shown in FIG. 1, each of the content provider systems 120*a-c* comprise a content server 130 which is programmed to communicate digital content to the user devices 110*a-c* via the network 112. For example, the content server 130 in content provider system 120*a* may be programmed to communicate television programming to the user devices 110*a-c*. The content server 130 in content provider system 120*b* may be programmed to communicate Web services content to user devices 110*a-c*. The content server 130 in content provider system 120*c* may be programmed to stream video content across an internet connection, such as streaming over the top content.

The administrative server 132 is programmed to provide administrative functions associated with the content provider system 110*a*. For example, the administrative server 132 may be programmed to register users with the particular content provider system and receive data relating to users. The administrative server 132 may be programmed to receive information such as, for example, a new user's address, date of birth, and any other relevant characteristics. The administrative server 132 communicates the received user data to the user data database server 134 where the data is stored.

The user data database server 134 generates a unique identifier for the newly created user and stores the received user characteristics data in relation to the user identifier. As a user interacts with a particular content provider system 120 to request and consume content, the user data database 134 of the particular provider system may be updated to record information about the user interactions.

The user data database server 134 may be programmed to store the user data in encrypted form. The user data database server 134 may generate a public key and private key pair for each particular user. In an example embodiment, the user's private key may be a hierarchical private key that is generated from a private key that is associated with the particular content provider system 120. A user's data that is stored in a content service provider's user data database 130 may be encrypted using the particular user's public key. The encrypted data may be decrypted using either the user's private key or by the content provider system's private key. Both the user's public key and private key may be stored in the user data database 134 along with the remainder of the user's data.

Each content provider system 120 further comprises a first distributed database 136. The first distributed database 136 has stored therein data identifying for each of the plurality of users, one or more content provider systems with which the particular user is associated. The first distributed database 136 comprises for each content provider system with which a particular user is associated, data identifying the location on the particular content provider system of the user data for the particular user. In an example, the location may be identified by a link to the user data in the user database for the particular content service provider.

In an example scenario, the first distributed database 136 may comprise, for each user, a master public key that corresponds to the particular user for all content service providers. Stored in relation to the master public key for a user are one or more user identifiers, one each for the content server providers with which the particular user is associated. In an example scenario, the user identifiers that are stored in the first distributed database 136 may be the public keys of the particular user in the particular content provider system. The information identifying the location of the user data may be stored in relation to the appropriate user public key.

The first distributed database 136 is distributed to each of content provider systems 120*a*-*c*. Accordingly, if the first distributed database 136 on the content provider system 120*a* is updated to reflect a new user associated with content provider 120*a*, the updates to the first distributed database 136 are propagated to the replicated copies of first distributed database 136 on the content provider system 120*b* and the content provider system 120*c*.

The first distributed database 136 may be implemented using any suitable technology. For example, the first distributed database 136 may be a distributed hash table.

Each of the content provider systems 120*a*-*c* further comprises a second distributed database 138. The second distributed database 138 comprises access rights data identifying for each user, the entities that are authorized to access the user's data in each of the content provider systems used by the particular user. For example, the second distributed database 138 may comprise data identifying that for a particular user, a particular entity such as, for example, a car company, is authorized to receive user data maintained by one or more the content provider systems 120*a*-*c*. In an example, the data rights data may comprise each user's master public key along with data identifying the entities that are authorized to view the particular user's data. In an example scenario, the rights data may further comprise, in addition to a user's master public key, the user's public keys associated with particular content provider systems. The data may specify which entities are authorized to access user data from particular content provider systems. The access rights data may reflect arrangements that have previously been made between various entities and the content provider systems 120*a*-*c*. For example, a particular entity such as, for example a car manufacturer, may have previously arranged with content provider systems 120*a* and 120*b* to be provided access to data for users of those particular systems. As a result, the access rights data will reflect that the particular entity has access rights to the user data for any user of content provider systems 120*a* and 120*b*.

The second distributed database 138 further comprises data recording accesses made to the user data in the user data databases 134 on the content provider systems 120*a*-*c*. Accordingly, when a particular entity is provided access to user data maintained by one of content service provider systems 120*a*-*c*, the second distributed database 138 is updated to reflect the access provided to the particular entity.

The second distributed database 138 is distributed to each of content provider systems 120*a*-*c*. Accordingly, if the second distributed database 138 on the content provider system 120*a* is updated to reflect an access to particular user data, the updates to the second distributed database 138 are propagated to the copies of second distributed database 138 on the content provider system 120*b* and the content provider system 120*c*.

The second distributed database 138 may be implemented using any suitable technology. For example, the second distributed database 138 may be implemented using block chaining. In an example, each access to a particular user's data from a user data database 134 may be represented as a block in the block chain. The block identifies all relevant information relating to the particular data access including, for example, the particular data that was accessed, the entity that accessed the data, and the date and time of the access. After a block is generated, it is encrypted and added to the chain of existing blocks.

Each of the content provider systems 120*a*-*c* further comprises a data request interface 140. The data request interface 140 is programmed to receive and process requests for data that has been accumulated by the corresponding content provider system 120. For example, the data request interface 140 may be programmed to receive requests from the data request and insertion system 150 for user data that has been accumulated by the content provider system 120*a*. The data request interface 140 is programmed to interface with the first distributed database 136 and the second distributed database 138 to determine whether the entity from which the request was received is authorized to receive the data, and if so, to provide the data. The data request interface 140 may be further programmed to receive requests to insert data into digital content served by the content server 130. For example, the data request interface 140 may receive from the data request and insertion system 150 a request to insert data relating to an advertisement into digital content generated by the content server 130.

Each of the content service provider systems 120*a*-*c* further comprises a first database interface application 160. The first database interface application 160 is programmed to perform operations with respect to the first distributed database 136. For example, the first database interface application 160 is programmed to update the first distributed database 136 to reflect new users that may have been added to the user data database 134. In the scenario where a user is added, the first database interface application 160 updates the first distributed database 136 to include the master public key that has been assigned to the new user and a pointer to the location of the data corresponding to the user. The user's public key is stored in relation to the master public key associated with the particular content provider system 120*a*.

The first database interface application 160 may also be programmed to query the first distributed database 136 in response to a request for data associated with users. For example, after a request for user data from a particular entity has been authorized, the first database interface application 160 queries the first distributed database 136 to determine the location of data corresponding to the particular users whose data the particular entity is authorized to receive. The first database interface application 160 retrieves the data regarding the determined users from the corresponding locations and stores the retrieved data at a location accessible by the requesting entity.

Each of the content service provider systems 120*a*-*c* further comprises a second database interface application 162. The second database interface application 162 is programmed to perform operations with respect to the second distributed database 138. For example, the second database interface application 162 is programmed to receive requests for user data that is stored in the various user databases that are maintained by the content service providers 120*a*-*c*. In an example scenario, a request for data may be received at the second database interface application 162 from data request interface 140, which receives the request from data request and insertion system 150. In an example scenario, the request for data may be received from an entity for purposes of determining characteristics of users in connection with identifying advertisements to be inserted into a content stream.

In response to receiving a request for user data, the second database interface application 162 may query the second distributed database 138 to determine users whose content the particular entity is authorized to access. For example, in response to a request from a particular entity for user data, the second database interface application 162 queries access rights data in the second distributed database 138 to determine which users, if any, have authorized the particular entity to access its user data. If the access rights data indicates the particular entity is authorized to view a particular user's data, the second database interface application 162 requests that the first database interface 160 query the first distributed database 136 to determine the location of data associated with the particular user. The second database interface application 162 updates the second distributed database 138 to record the particular user data that has been accessed by the requesting entity.

Figure 2:
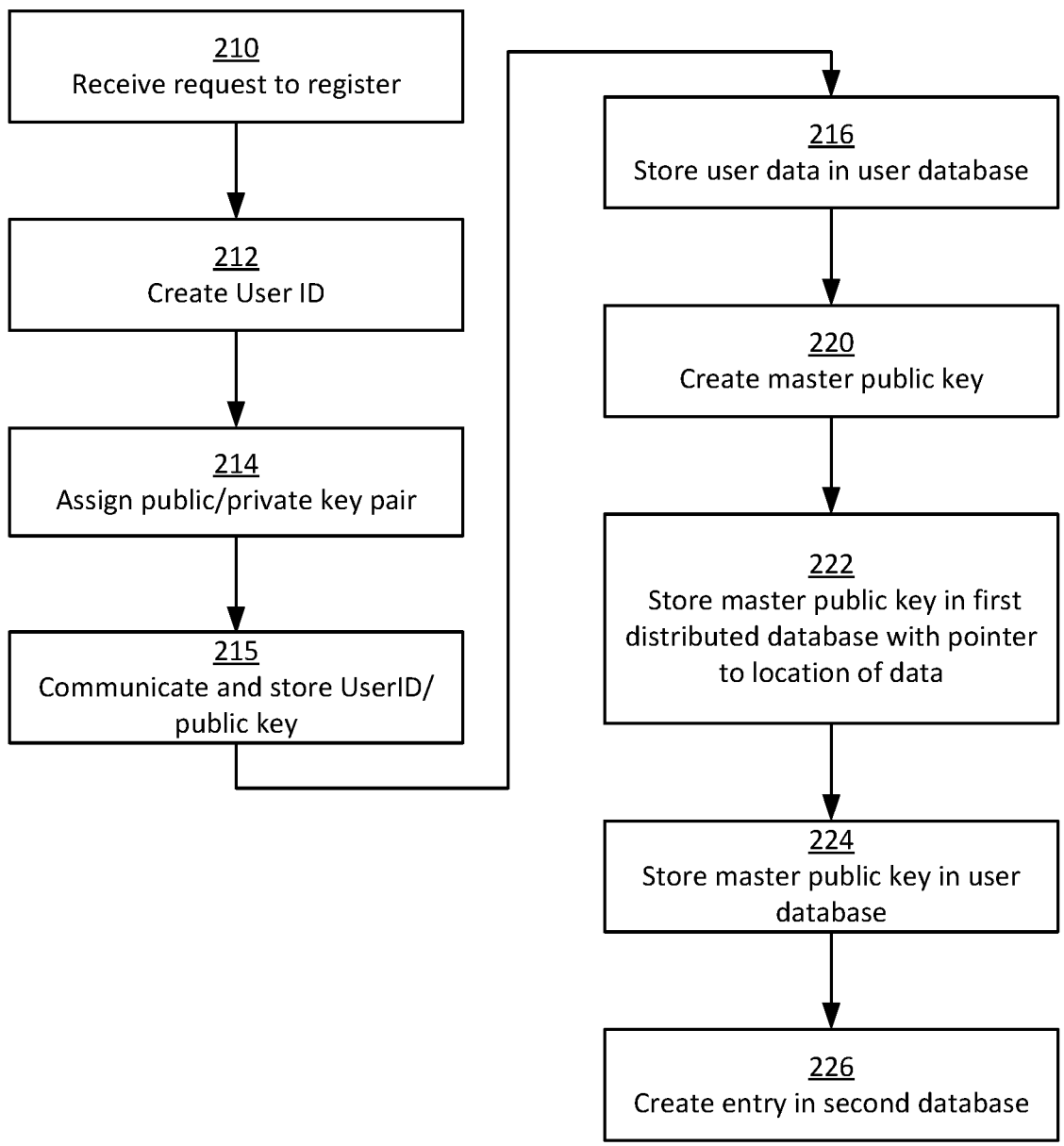
FIG. 2 depicts a flow diagram of example processing for creating a user in a content provider system.

Creating a new user of any of the content provider systems 120a-c involves establishing corresponding data in the corresponding user data database 134, the first distributed database 136, and the second distributed database 138. FIG. 2 depicts a flow diagram of example processing for creating a new user in the content provider system 120a. At block 210, a request to create a new user is received at the administration server 132 of the content provider system 120a. In an example, the request may be received from user device 110a and may comprise any suitable information relating to the particular user. For example, the request may specify a name, address, age, and/or any other suitable data relating to characteristics of the particular user. For example, the request may further specify viewing preferences and interests of the particular user.

At block 212, the administration sever 132 generates a user identifier or user ID for the particular user. The user ID uniquely identifies the particular user within the content provider system 120a.

At block 214, the administration server 132 assigns a public/private key pair to the particular user. The public/private key pair may be derived in any suitable manner and is used to securely store data relating to the particular user within content provider system 120a. In an example scenario, the private key is a hierarchical private key that is generated from a private key associated with the content provider system 120a. Data that is encrypted with the user's public key may be decrypted using either the user's private key or the private key of the content provider system 120a. Accordingly, both the user and the system 120a may control access to the user data stored in user database 134.

At block 215, the administration server 132 communicates the user identifier and public key to the user system 110a where the data is stored by the autonomous program 114a. The user device 110a may use the user identifier and public key in communications with the content provider system 120a. The autonomous program may use the user identifier and/or public key to identify instances that the device 110a is subsequently used to access other content provider services 120b and 120c.

At block 216, the administration sever 132 stores data relating to the particular user in the user data database 134. In an example embodiment, the assigned user identifier is stored along with the received information relating to the particular user including, for example, the user's name, address, age, and any other attribute data. In addition, the public/private key which have been assigned to the particular user are stored in relation to the user. The user data may be encrypted prior to storing using the public key assigned to the particular user. The encrypted data may be decrypted using the private key assigned to the user, and, if hierarchically related to the private key of the content provider 120a, using the private key of the content provider 120a.

At block 220, in response to the creation of the user data in user database 134, the first database interface 160 generates a master public key. The master public key is used to uniquely identify the particular user across all of the content provider systems 120a-c. In other words, data relating to the particular user, regardless of which content provider system 120 it derives from, may be associated with the master public key.

At block 222, the first database interface 160 stores the master public key in the first distributed database 136 in relation to the public key generated by the content provider system 120a for the particular user. Stored in relation to the user's public key is an indication of the location of the data within content provider system 120a. The first database interface 160 encrypts the stored data.

At block 224, the first database interface 160 stores the master public key created for the particular user in relation to the user database 134.

At block 226, in response to the creation of the entry in the first distributed database 136, the second database interface 162 generates an entry in the second distributed database 138 indicating the creation of the particular user within the particular content provider system 120a. If the second distributed database 138 is a block chain, the second database interface 162 adds a new block to the chain, with the new block recording the creation of the new user.

Figure 3:
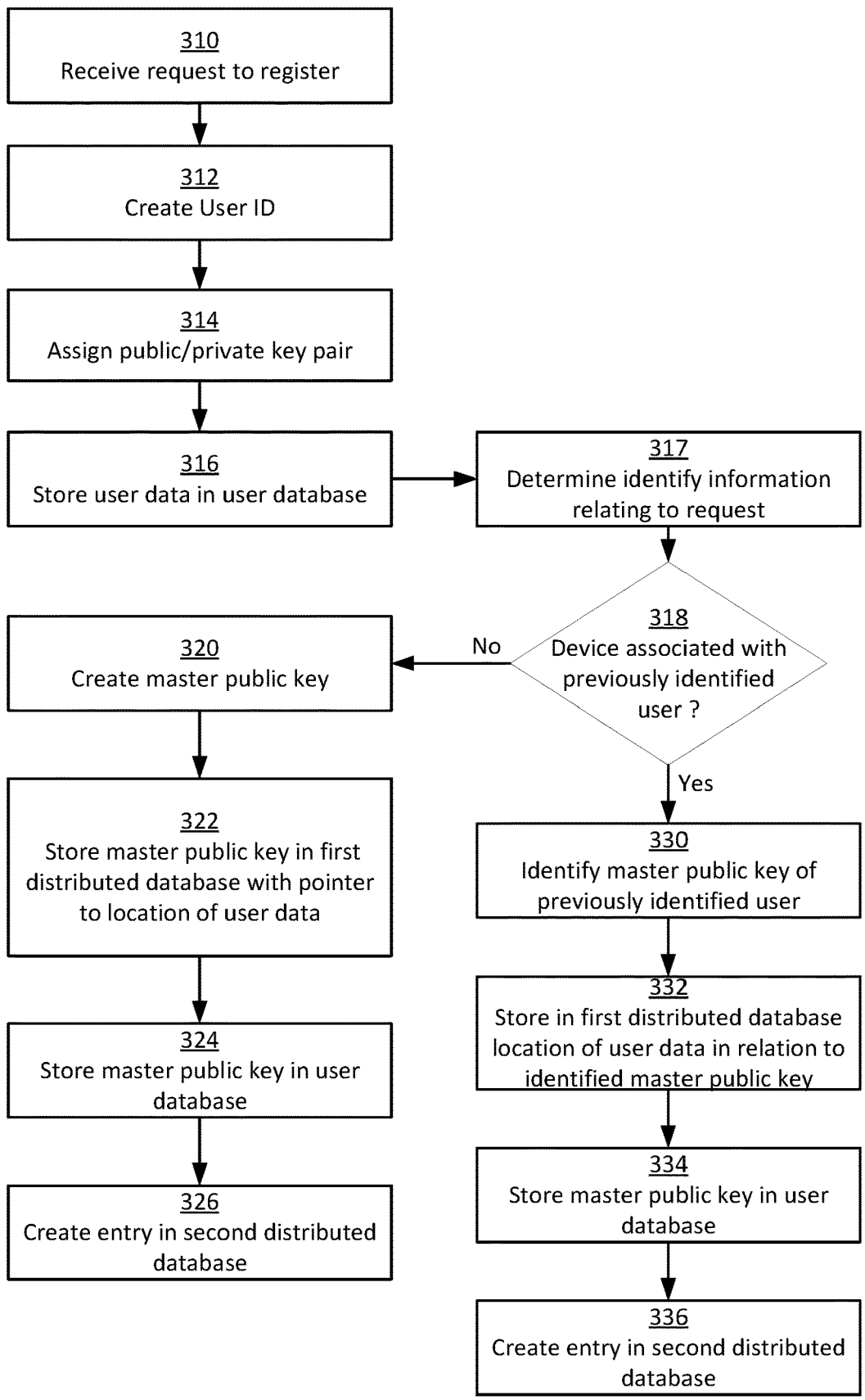
FIG. 3 depicts a flow diagram of example processing for creating a user in a content provider system.

After an entry has been created for a user in the first distributed database 136, subsequent activities by the same user with other content provider systems are identified as corresponding to the same user by appropriately updating the first distributed database 136. FIG. 3 depicts a flow diagram of example processing for associating a user who accesses a second content service with a previously created user. At block 310, a user request is received at content provider system 120b. For example, a request may be received from user device 110a to register with content provider system 120b.

Processing proceeds at blocks 312, 314, and 316, consistent with the description of blocks 212, 214, and 216 of FIG. 2, to assign a user ID, assign a public/private key pair, and store the user data in a user database 134 of content provider system 120b.

At block 317, identifying information relating to the request is determined. In on one example, the first database interface 160 determines the identifying information relating to the request. For example, the first database user interface 160 may determine the device identifier associated with the particular request or a login identifier used in connection with the request. In another example, the autonomous program 114a executing on the device 110a from which the request originated may determine identifying information relating to the request. For example, the autonomous program 114a may recognize that device 110a has been used to access a particular service.

At block 318, it is determined whether or not the identifying information associated with the request is associated with a user who has previously received an entry in first distributed database 136. In an example, the first database interface 160 determines whether or not the identifying information associated with the request is associated with a user who has previously received an entry in the first distributed database. The first database interface 160 may determine that the device identifier associated with the request is the same device identifier that has previously been used by a user who has an entry in the first distributed database 136. In another example, the autonomous program 114a executing on the device 110a from which the request originated may determine whether the device 110a was previously used to access another service. For example, the autonomous program 114a may refer to information stored on the device 110a relating to a registration with another server. In an example scenario, the autonomous program 114a may determine that an identifier such as, for example, a public key, relating to a service provided by content provider 120a is stored on the device 120a.

If it is determined that identifying information of the request is not associated with a user who has previously received an entry in the first distributed database 136, processing continues at blocks 320 through 326 consistent with the processing described above in connection with blocks 220 through 226 of FIG. 2.

If at block 318 it is determined that the identifying information of the request is associated with a user who has previously received an entry in the first distributed database 136, at block 330, the master public key previously assigned to the particular user is identified. In an example, the first database interface 160 may determine from the first distributed database 136 the master public key that was previously assigned to the particular user. In another example, the autonomous program 114a, in response to identifying the identifier associated with the first content provider 120a, may form a temporary relationship between the identifier for the user associated with the first content provider 120a and the identifier for the user associated with the second content provider 120b, and transmit a request to first database interface 160 to determine the master public key that was previously assigned to the user having the identifier associated with the first content provider 120a for purposes of associating the identifier associated with the second content provider 120b with the same master public key.

At block 332, the public key generated by content provider system 120b for the particular user is stored in the distributed database 136 in relation to the identified master public key. In an example, the first database interface 160 stores the public key in the first distributed database 136. The first database interface 160 may operate in response to a request from the autonomous program 114a on device 110a that has determined that the device 110a has stored thereon a public key associated with the first content provider 120a and a public key associated with the second content provider 120b. Data identifying the location of the data within content provider system 120b for the particular user is stored in relation to the user's public key. The first database interface 160 encrypts the stored data.

At block 334, the first database interface 160 stores the master public key for the particular user in relation to the user in the user data database 134 of content provider system 120b.

At block 336, in response to the creation of the entry in the first distributed database 136, the second database interface 162 generates an entry in the second distributed database 138 indicating the creation of the particular user within the particular content provider system 120b. If the second distributed database 138 is a block chain, the second database interface 162 adds a new block to the chain, with the new block recording the creation of the new user.

Figure 4:
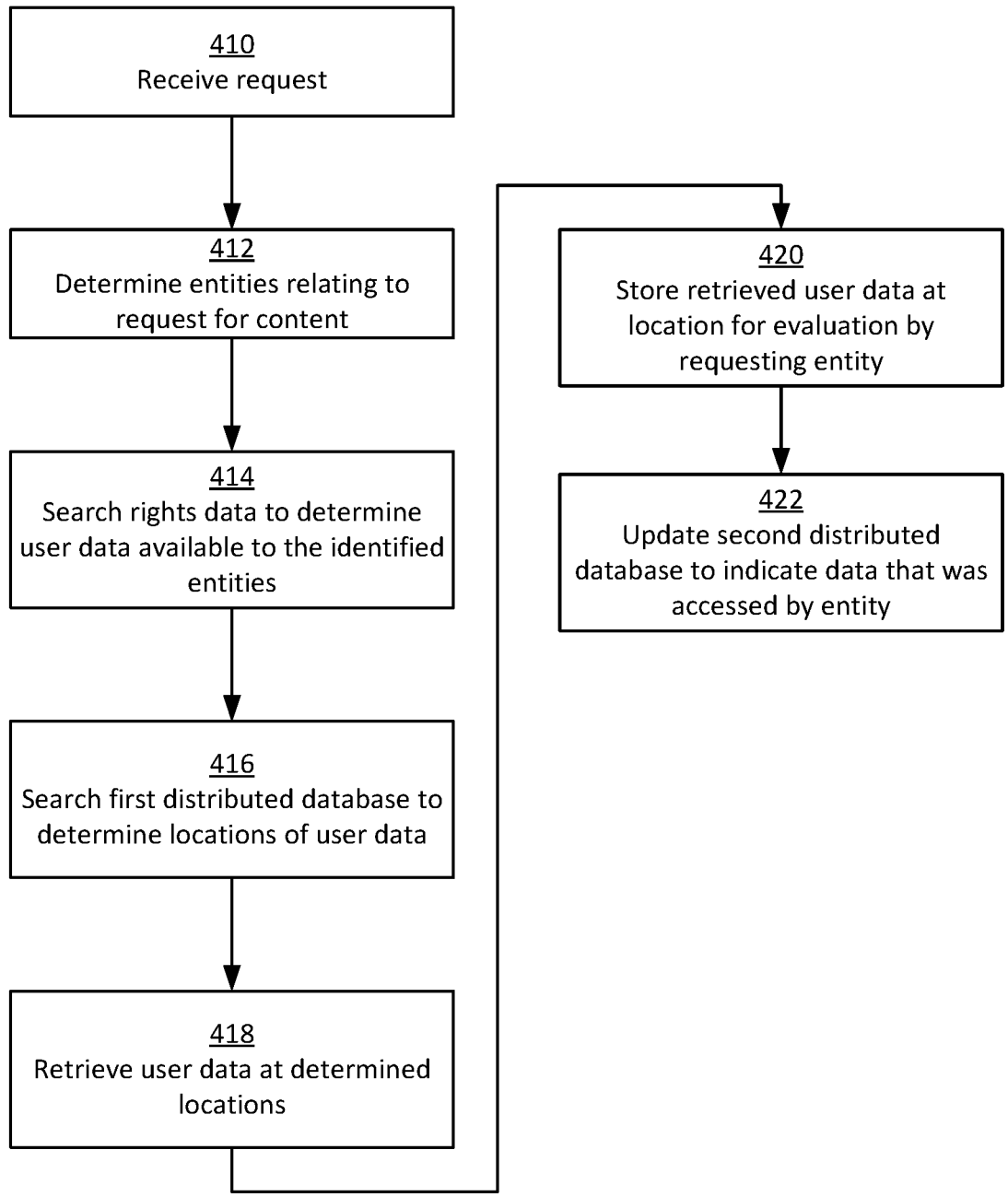
FIG. 4 depicts a flow diagram of example processing for responding to a request for user data.

The data stored in the first distributed database 136 and the second distributed database 138 allow for controlled access to the user data maintained separately be each of the content provider systems 120a-c. According to an example aspect, controlled access to the user data may be implemented in connection with identifying advertisement placement opportunities and filling the advertisement opportunities. In such an implementation, an advertisement server system, which may be a data request and insertion system 150, may be programmed to request and receive data relating to users, and, based upon the received user data, to determine advertising content that should be inserted into digital content that is generated by a content server system 120. In such a scenario, the data request and insertion system 150 may be programmed to request and analyze data regarding users of content server systems 120a-c and, based upon the analysis of the user data, request that particular advertisements be inserted into the digital content transmitted by the content server systems 120a-c. In an example scenario, the data request and insertion system 150 may communicate a particular advertisement to content provider system 120a and direct the content provider system 120a to insert the advertisement in content being directed to particular users and/or at a particular time. FIG. 4 depicts a flow diagram of example processing of a request to access user data such as may occur, for example, in connection with identifying advertisement placement opportunities. At block 410, a request to retrieve user data is received at one of content provider systems 120a-c. In an example, the request is received at content provider system 120a and may be received from, for example, data request and insertion system 150.

At block 412, the second database interface 162 determines or identifies one or more entities that are associated with the request. In an example scenario, the request may be received from a particular entity such as a car manufacturer that wishes to review user data in connection with identifying advertisements suitable for insertion into a content stream. The request may be associated with a particular advertising broker or seller.

At block 414, the second database interface 162 searches the access rights data that is maintained by the second distributed database 138 for data relating to the particular entity from which the request was received. The rights data may specify the entities that are authorized to access the user data corresponding to each master public key. In response to a request from a car manufacturer, the second database interface 162 searches the rights data for those master public keys that have associated data indicating the particular car manufacturer is authorized to access the corresponding user data.

In some instances, the second database interface 162 may impose additional limitations on whether a particular entity is to be given access to user data. For example, where the second distributed database 138 is implemented as a block chain, and a requesting entity itself maintains a copy of the block chain, the second database interface 162 may disallow an entity to access user data if the entity has not maintained its block chain. In other words, where an entity is requesting data from another entity, but has not maintained its copy of the block chain, the request for data may be denied. As a consequence of this possibility, entities are incentivized to maintain the block chain.

At block 416, the first database interface 160 searches the first distributed database 136 to determine locations of user data that the requesting entity is authorized to access. For example, the first database interface 160 may search for the master public keys that were identified as accessible to the requesting entity and identify the individual public keys and user data locations that correspond to the identified master public keys. For example, if a master public key relates to two public keys, each related to one of content provider systems 120a-c, the first database interface 160 retrieves the location of the user data corresponding to the public keys.

At block 418, the first database interface 160 retrieves user data from the identified locations. For example, if the determined locations exist in user database 134 of content provider system 120a, the first database interface 160 retrieves the user data from the identified locations in user database 134 of content provider system 120a. Likewise, if the determined locations exist in user database 134 of content provider system 120b, the first database interface 160 retrieves the user data from the identified locations in user database 134 of content provider system 120b.

At block 420, the first database interface 160 stores the retrieved data at a location that is accessible by the requesting entity. For example, the user data may be stored at a location that is accessible to the data request and insertion system 150. The data request and insertion system may evaluate the data to determine whether particular content should be inserted into particular content being served by content server 130. For example, if the data request and insertion system 150 determines from the user data that a particular advertisement should be inserted, data request and insertion system 150 may request that content server 130 insert the particular advertisement.

At block 422, the second database interface 162 stores in the second distributed database 138 information identifying the particular user data that was access by the entity. If the second distributed database 138 is implemented as a block chain, a new block may be added to the chain identifying the particular user data that was accessed and the particular entity that accessed the data.

It will be appreciated that over time, the second distributed database 138 may accumulate data regarding the particular data that is being accessed and the particular entities that are accessing the data. The accumulated data may be of interest to the owners or operators of the content provider systems 120a-c as it may provide a mechanism for an accounting for use of a particular owner or operator's data.

Figure 5:
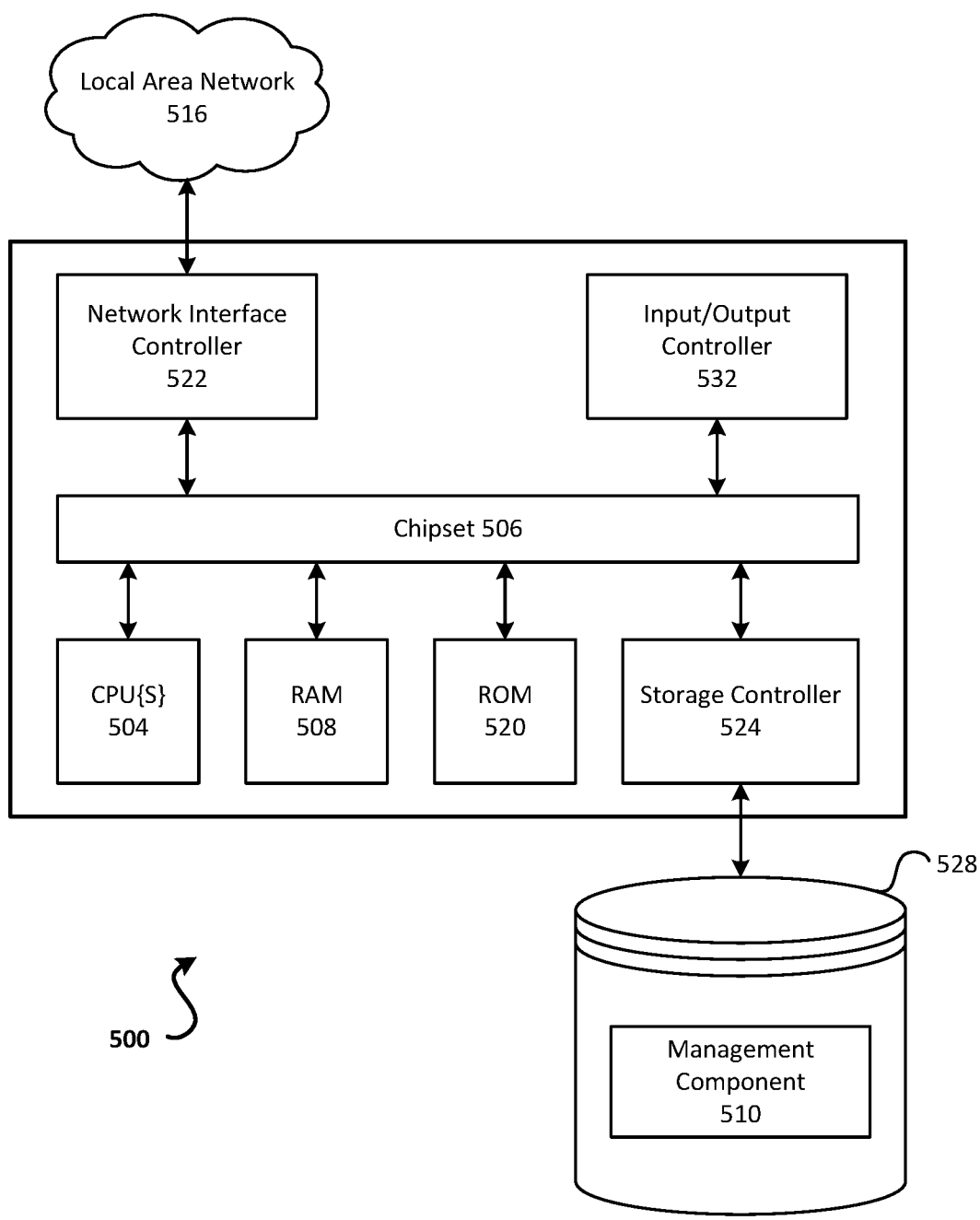
FIG. 5 depicts an example computing system.

FIG. 5 depicts an example computer architecture for a computing system 500 capable of executing software for performing operations as described above in connection with FIGS. 1-4. The computer architecture shown in FIG. 5 illustrates a conventional server computer, workstation, desktop computer, laptop, tablet, network appliance, PDA, e-reader, digital cellular phone, or other computing node, and may be utilized to execute any aspects of the software components presented herein described as executing on devices 110a-c, systems 150, and content provider system 120a-c, or on any other computing system mentioned herein.

Computer 500 may include a baseboard, or "motherboard," which is a printed circuit board to which a multitude of components or devices may be connected by way of a system bus or other electrical communication paths. One or more central processing units (CPUs) 504 may operate in conjunction with a chipset 506. CPUs 504 may be standard programmable processors that perform arithmetic and logical operations necessary for the operation of computer 500.

CPUs 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 506 may provide an interface between CPUs 504 and the remainder of the components and devices on the baseboard. Chipset 506 may provide an interface to a random access memory (RAM) 508 used as the main memory in computer 500. Chipset 506 may further provide an interface to a computer-readable storage medium, such as a read-only memory (ROM) 520 or non-volatile RAM (NVRAM) (not shown), for storing basic routines that may help to start up computer 500 and to transfer information between the various components and devices. ROM 520 or NVRAM may also store other software components necessary for the operation of computer 500 in accordance with the embodiments described herein.

Computer 500 may operate in a networked environment using logical connections to remote computing nodes and computer systems through LAN 516. Chipset 506 may include functionality for providing network connectivity through a network interface controller (NIC) 522, such as a gigabit Ethernet adapter. NIC 522 may be capable of connecting the computer 500 to other computing nodes over LAN 516. It should be appreciated that multiple NICs 522 may be present in computer 500, connecting the computer to other types of networks and remote computer systems.

Computer 500 may be connected to a mass storage device 528 that provides non-volatile storage for the computer. Mass storage device 528 may store system programs, application programs, other program modules, and data, which have been described in greater detail herein. Mass storage device 528 may be connected to computer 500 through a storage controller 524 connected to chipset 506. Mass storage device 528 may consist of one or more physical storage units. Storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 500 may store data on mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 528 is characterized as primary or secondary storage and the like.

For example, computer 500 may store information to mass storage device 528 by issuing instructions through storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 500 may further read information from mass storage device 528 by detecting the physical states or characteristics of one or more particular locations within the physical storage units.

In addition to mass storage device 528 described above, computer 500 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 500.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 528 may store an operating system utilized to control the operation of the computer 500. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 528 may store other system or application programs and data utilized by computer 500, such as management component 510 and/or the other software components described above.

Mass storage device 528 or other computer-readable storage media may also be encoded with computer-executable instructions, which, when loaded into computer 500, transforms the computer from a general-purpose computing system into a special-purpose computer capable of implementing the embodiments described herein. These computer-executable instructions transform computer 500 by specifying how CPUs 504 transition between states, as described above. Computer 500 may have access to computer-readable storage media storing computer-executable instructions, which, when executed by computer 500, may perform operating procedures described above in connection with FIGS. 1-4.

Computer 500 may also include an input/output controller 532 for receiving and processing input from a number of input devices, such as a keyboard, a mouse, a touchpad, a touch screen, an electronic stylus, or other type of input device. Similarly, input/output controller 532 may provide output to a display, such as a computer monitor, a flat-panel display, a digital projector, a printer, a plotter, or other type of output device. It will be appreciated that computer 500 may not include all of the components shown in FIG. 5, may include other components that are not explicitly shown in FIG. 5, or may utilize an architecture completely different than that shown in FIG. 5.

Accordingly, systems and methods have been described that provide distributed controlled access to data stored across a plurality of data sources. The described systems allow for data to be shared and aggregated across data sources, while allowing the individual data sources to maintain control of their data.

It will be appreciated that while example embodiments have been described in connection with data relating to system users and retrieving the data for purposes of determining advertising content, the intended embodiments extend to controlling access to any type of distributed data for any purpose.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method comprising:

storing, at a first content provider system of a plurality of content provider systems, user data associated with at least one user of the first content provider system, wherein the at least one user is also a user of the other content provider systems of the plurality of content provider systems;

maintaining, at the first content provider system, a first distributed database, the first distributed database comprising, for the at least one user, a master public key configured to identify the user on each of the plurality of content provider systems and, for each of the content provider systems, information identifying at least one storage location on the content provider system at which user data associated with the at least one user is stored, wherein a copy of the first distributed database is stored at each of the other content provider systems of the plurality of content provider systems;

maintaining, at the first content provider system, a second distributed database, the second distributed database comprising, for the at least one user, access rights data identifying one or more entities authorized to access user data associated with the at least one user, and data that records accesses of the user data associated with the at least one user by the one or more entities, wherein a copy of the second distributed database is stored at each of the other content provider systems of the plurality of content provider systems;

in response to a request from a requesting entity for user data associated with the at least one user, querying the second distributed database to determine whether the user data associated with the at least one user is accessible to the requesting entity;

based on determining that the user data associated with the at least one user is accessible to the requesting entity, querying the first distributed database to determine, for the at least one user, one or more storage locations on the plurality of content provider systems at which user data associated with the at least one user is stored;

retrieving user data associated with the at least one user from the determined one or more storage locations on the plurality of content provider systems;

storing the retrieved user data in a location, different from the first distributed database and the second distributed database, that is accessible by the requesting entity, wherein the retrieved user data can be used to determine one or more advertisements to present to the at least one user; and recording, in the second distributed database maintained by the first content provider system, information indicating that the requesting entity has accessed the retrieved user data from the determined one or more storage locations, wherein the information indicating that the requesting entity has accessed the retrieved user data is propagated to the copies of the second distributed database stored on each of the other content provider systems.

2. The method of claim 1, wherein each of the plurality of content provider systems comprises one or more of a cable television system, an Internet service system, or a Web content system.

3. The method of claim 1, wherein the user characteristics associated with the at least one user comprise one or more of age, address, areas of interest, or viewing preferences.

4. The method of claim 1, wherein the information identifying, for each of the plurality of content provider systems, the at least one data storage location at which user data associated with the at least one user is stored comprises a pointer to a storage location comprising at least part of the user data.

5. The method of claim 1, wherein the user data associated with the at least one user further comprises a public key and a private key pair.

6. The method of claim 5, wherein the user data is encrypted using the public key.

7. The method of claim 5, wherein the first distributed database further comprises, for the at least one user, the public key stored in relation to the master public key.

8. The method of claim 1, wherein the first distributed database comprises a distributed hash table.

9. The method of claim 1, wherein the second distributed database comprises a block chain.

10. The method of claim 9, wherein the block chain comprises a plurality of blocks, each block comprising information specifying actions taken with respect to the user data.

11. The method of claim 1, wherein the requesting entity comprises one or more of: an advertising entity, an advertisement broker, an advertisement seller, an advertisement insertion system, or an advertisement server system.

12. A method comprising:
receiving, from a requesting entity, at a content provider system of a plurality of content provider systems, a request for user data associated with at least one user of the plurality of content provider systems;
querying a second distributed database to determine whether the user data associated with the at least one user is accessible to the requesting entity, wherein the second distributed database comprises, for the at least one user, access rights data identifying one or more entities authorized to access user data associated with the at least one user, and data that records accesses of the user data associated with the at least one user by the one or more entities, and wherein a copy of the second distributed database is stored at each of the other content provider systems of the plurality of content provider systems;
based on determining that the user data associated with the at least one user is accessible to the requesting entity, querying a first distributed database to determine, for the at least one user, one or more storage locations on the plurality of content provider systems at which user data associated with the at least one user is stored, wherein the first distributed database comprises, for the at least one user, a master public key configured to identify the user on each of the plurality of content provider systems and, for each of the content provider systems, information identifying at least one storage location on the content provider system at which user data associated with the at least one user is stored, and wherein a copy of the first distributed database is stored at each of the content provider systems of the plurality of content provider systems;
retrieving user data associated with the at least one user from the determined one or more storage locations on the plurality of content provider systems; and
recording, in the second distributed database, information indicating that the requesting entity has accessed the retrieved user data from the one or more storage locations, wherein the information indicating that the requesting entity has accessed the retrieved user data is propagated to the copies of the second distributed database stored on each of the content provider systems.

13. The method of claim 12,
wherein querying the second distributed database comprises querying the second distributed database to determine one or more public keys associated with the at least one user, and
wherein querying the first distributed database comprises querying the first distributed database to determine one or more storage locations one the plurality of content provider systems associated with the one or more public keys associated with the at least one user.

14. The method of claim 12,
wherein the second distributed database comprises a block chain database, and
wherein recording in the second distributed database the information indicating that the requesting entity has accessed the retrieved user data comprises adding a block to the block chain database.

15. The method of claim 14, further comprising replicating the added block in each copy of the first distributed database stored on each of the plurality of content provider systems.

16. The method of claim 12, wherein the requesting entity comprises one or more of: an advertising entity, an advertisement broker, an advertisement seller, an advertisement insertion system, or an advertisement server system.

* * * * *